US00RE36035E

United States Patent [19]

Usen et al.

[11] E Patent Number: Re. 36,035

[45] Reissued Date of Patent: Jan. 12, 1999

[54] PLURAL CHAMBERED SQUEEZABLE DISPENSING TUBE

[75] Inventors: Norman Usen, Marlboro; Anthony E. Winston, East Brunswick, both of N.J.

[73] Assignee: Enamelon, Inc., East Brunswick, N.J.

[21] Appl. No.: 966,424

[22] Filed: Nov. 7, 1997

Related U.S. Patent Documents

Reissue of:

[64] Patent No.: 5,628,429
Issued: May 13, 1997
Appl. No.: 562,363
Filed: Nov. 22, 1995

[51] Int. Cl.[6] ..... B67B 7/00

[52] U.S. Cl. ..... 222/1; 222/94; 53/469; 53/474; 141/113; 215/2

[58] Field of Search ..... 222/1, 94, 107; 53/469, 474; 141/113; 215/2

[56] References Cited

U.S. PATENT DOCUMENTS

| | | | |
|---|---|---|---|
| 3,290,422 | 12/1966 | Michel | 264/259 |
| 3,307,738 | 3/1967 | Scheindel | 220/83 |
| 3,506,157 | 4/1970 | Dukess | 222/94 |
| 4,080,440 | 3/1978 | Digiulio et al. | 424/49 |
| 4,083,955 | 4/1978 | Grabenstetter et al. | 424/49 |
| 4,397,837 | 8/1983 | Raaf et al. | 424/51 |
| 5,076,464 | 12/1991 | Simon | 220/530 |
| 5,244,120 | 9/1993 | O'Meara | 222/94 |
| 5,269,441 | 12/1993 | O'Meara | 222/94 |
| 5,318,203 | 6/1994 | Iaia et al. | 222/94 |
| 5,615,803 | 4/1997 | Hatakeyama et al. | 222/94 |
| 5,714,023 | 3/1998 | Redfern | 53/469 X |

*Primary Examiner*—Gregory L. Huson
*Attorney, Agent, or Firm*—Depaoli & Frenkel, P.C.

[57] ABSTRACT

The present invention relates to plural compartment assemblies in which materials are stored in at least two separate compartments until the compartments are opened for use. More particularly, the invention relates to a dispensing tube whereby the utilization of a novel insert, a conventional dispensing tube can be divided into separate and discrete compartments at a low cost. The resulting dispensing assembly provides for dispensing more than one material from the same tube and even more particularly co-dispense predetermined proportions of incompatible materials simultaneously and effectively.

42 Claims, 2 Drawing Sheets

PLURAL CHAMBERED SQUEEZABLE DISPENSING TUBE

Matter enclosed in heavy brackets [ ] appears in the original patent but forms no part of this reissue specification; matter printed in italics indicates the additions made by reissue.

FIELD OF THE INVENTION

The present invention relates to plural compartment assemblies in which materials are stored in at least two separate compartments until the compartments are opened for use. More particularly, the invention relates to dispensing means whereby the utilization of a novel insert, a conventional dispensing tube can be divided into separate and discrete compartments at a low cost. The resulting dispensing assembly provides for dispensing more than one material from the same tube and even more particularly co-dispense predetermined proportions of incompatible materials simultaneously and effectively.

BACKGROUND OF THE INVENTION

There are many products on the market today and many more waiting to be marketed which require the separation of components thereof due to their instability or the release of actives, and the like, but must or, desirably, be dispensed simultaneously.

Some of the dual-dispensed products on the market today are peroxide toothpastes, hair coloring, epoxy adhesives, and the like. Many of these products require costly dispensers and fabricating and packaging equipment to produce dispensing means which deliver the separate components simultaneously. Besides the high cost, most of the dual-dispensers available today are not reliable and require a change in the target consumers normal use habits with the product. These restrictions also keep many products, that can bring major benefits to consumers but require dual-dispensing, from the market.

Products consisting of two flowable components such as pastes, gels, or liquids which must be stored separately are desirably packaged in containers having two compartments. Tubular bodies having chordal partitions are useful in providing two-compartment containers for two-component products which must have predetermined proportions of their components mixed at the time or point of use.

A number of longitudinally partitioned tubular bodies and dispensing containers having chordal partitions have been disclosed in the art. For instance, U.S. Pat. No. 3,290,422, issued Dec. 6, 1966 to Michel, discloses a method of producing a dispensing container by injection molding a head fitment and a longitudinally extending partition onto and inside of, respectively, a tubular body. Tubular containers having asymmetrically disposed chordal partitions are disclosed in U.S. Pat. No. 3,506,157, issued Apr. 14, 1970 to Dukess. Tubular bodies formed from sheet material are also disclosed in the prior art in, for example, U.S. Pat. No. 3,307,738, issued Mar. 7, 1967 to Scheindel.

U.S. Pat. No. 5,076,464, issued Dec. 31, 1991 to Simon discloses a deformable tubular container which includes at least one longitudinal corrugated partition-forming wall which defines distinct compartments and which lends itself to a flattened seal at the end of the tube body. Here too, however, the body and wall are produced by injection molding in a mold and the wall is permanently molded to the body. U.S. Pat. Nos. 5,244,120 and 5,269,411, issued to O'Meara on Sep. 14, 1993 and Dec. 31, 1993 respectively are similar in the scope of disclosure to the above earlier patent.

None of the referenced prior art has, however, solved all the problems associated with providing longitudinally partitioned tubular bodies such as, for example, simplicity of manufacture, at a low cost and without changing consumers' habits in the manner of, nor to the degree of, the present invention.

There are many cleaning, drug and personal products which are marketed today in single dispensing packages which could be dramatically improved if an inexpensive dual dispensing device were available. For example, products containing oxidizing agents, reducing agents, solvents, or materials with high or low pH's can be improved aesthetically by separating the flavor, fragrance or other components that normally would not withstand shelf life.

Many of the dually-dispensed products which are currently on the market and those which are not yet on the market can be dispensed from a tube rather than more costly dispensing means. A tube is a dispensing device that is readily available, familiar to most consumers, is comparatively less expensive and does not require elaborate filling equipment. If commercially available tubes can be easily and cheaply converted into dual-dispensing devices, it would be a great advantage to those either currently marketing or planning to market dually-dispensed products.

SUMMARY OF THE PRESENT INVENTION

This invention relates to an inexpensive insert that is die cut and inserted into a commercially available tube on the product filling line thereby dividing the tube volume into two distinct chambers before filling by the addition of each of two materials. By the addition of the novel insert, a conventional dispensing tube can be divided into separate and distinct compartments for dispensing more than one material from the same tube and, advantageously, co-dispense incompatible materials simultaneously and at a low cost.

By using commercially available tubes there is no need to interfere with the tube manufacturing process, speed of production or cost, and, advantageously, the later addition of the insert, possibly during the product filling operation, to form the co-dispensing unit, will cost far less, be more readily available in the size and form needed than existing molded codispensing units, and will not require a change in the consumers' use habits. To the consumer the dual-chambered tube looks and operates the same as a tube with a single compartment.

There are three major types of tubes commercially available which are suitable for dispensing product for consumer and professional use. The insert described by this invention will work in all three tube types, i.e., laminated, plastic or aluminum, converting each into a dual-dispensing tube. The insert material used for each different tube type, is inexpensive to produce and can be of a different base material or coating according to the tube into which it will be inserted. Allowance must be made, however, for proper sealing of the insert inside the tube so not to interfere with the normal sealing or crimping of the tube after product addition. Thus, the insert can be made from polycoated board, polyethylene sheet, laminated board or any other inexpensive material that can be formed, preferably be die cut, and able to heat seal or mechanically crimp to commercially available tubes.

The insert of the present invention once installed into the tube, seals against the walls of the tube by folded flaps formed by scoring the insert material. The insert force fits against the inside collar of the tube and the center or spine thereof extends up through the tube neck and, if desired, out the top orifice. In this way the insert divides the internal volume of the tube in half so that each half can be filled with separate materials. After filling the two compartments and sealing the bottom of the tube, each product can be dispensed simultaneously but without contact until it leaves the tube.

The insert can also be coated with materials that either chemically or physically seal the two compartments from cross contamination depending on the products to be separated and the degree of separation required.

In accordance with the present invention, one embodiment thereof relates to a substantially planar partition-forming member suitable for insertion into a squeezable cylindrical tube so as to form a partition and two separate and discrete compartments within the tube;

said tube having a dispensing end with affixed thereto a shoulder and a neck terminating as a dispensing orifice and adapted to receive a closing cap and an open filling end into which the partition-forming member is inserted prior to filling;

said partition-forming member having a configuration such that when inserted into the tube;

(i) the end of the partition-forming member corresponding to the dispensing end of the tube is substantially equal to the inner diameter of the neck and extends into the neck and, preferably, entirely through and beyond the orifice formed by the neck, (ii) the adjacent portion thereto conforms to the shape of the tube shoulder, (iii) the mid portion extends within the tube and has a width corresponding to at least one half the inner-circumference of the tube; and (iv) the terminal end of the partition-forming member corresponding to the filling end of the tube has a width substantially equal to one half the inner-circumference of said tube, said partition-forming member being scored along each longitudinal side at a distance from the edge thereof that when fully inserted into the tube the partition-forming member folds along the scoring thereby providing a spine between the scoring and two flaps adjacent thereto; and said partition-forming member being comprised of a material sufficiently resillient such that such member tends to revert to its original planar configuration thereby causing pressure of the flaps against the inner surface of the tube and providing a seal along the longitudinal edge with said inner surface of the tube.

In another embodiment of the present invention a squeezable dual compartment dispensing tube assembly, comprising:

a tubular container body having a dispensing end and affixed thereto a shoulder and a neck terminating as a dispensing orifice and adapted to receive a closing cap, and a filling end which is sealed after contents are placed in said compartments;

said tubular container body have positioned therein a substantially planar partition partition-forming insert which provides two adjacent compartments defined by a common wall segment and a pair of outer arcuate walls;

said planar insert having a configuration generally conforming to that of the tube if flattened and comprising an end portion which is substantially equal to the inner diameter of the neck and which extends into and, preferably, through and beyond the orifice formed by the neck, an adjacent portion conforming to the inside shape of the tube shoulder, a mid-portion extending axially within the tube and having a width of at least about one half the inner circumference of the tube, and a terminal end positioned within the filling end of the tube and having a width substantially equal to one half the inner-circumference of said tube, said planar insert having scoring along each longitudinal side to provide a spine between the scoring and a flap at either side of the scoring, wherein said insert can be folded into a generally "Z" shape, and said planar insert being comprised of a material sufficiently resilient such that the insert tends to revert to its original planar configuration thereby causing pressure of the flaps against the inner arcuate walls thereby providing a pressure seal along the longitudinal edges with the surface of said arcuate walls. The configuration into which the insert folds, advantageously, provides that when the tube is filled with product(s) such product (s) exert pressure against the surfaces of the flaps so as to force the flaps against the inner surface of the tube and improve the seal of the flaps against such tube inner surface wall.

In still another embodiment of this invention a method for assembling a dual compartment dispensing tube assembly is provided wherein said assembly comprises:

a tubular container body having a dispensing end and a filling end, and a shoulder and a neck terminating as a dispensing orifice and adapted to receive a closing cap affixed to the dispensing end of the tube;

a substantially planar partition forming insert member having a configuration generally conforming to that of the tube if flattened and comprising:

an end portion which is substantially equal to the inner diameter of the neck; an adjacent portion thereto conforming to the inside shape of the tube shoulder; an elongated mid-portion having a width of at least one half the inner circumference of the tube; and a terminal end having a width sub-stantially equal to one half the inner-circumference of the tube; scoring along each longitudinal side of the insert to provide a spine between the scoring and an elongated flap at either side of the scoring said insert comprised of a material sufficiently resilient such that the insert tends to maintain its planar configuration;

The method comprises:

(i) placing the tube in a position suitable for filling;

(ii) directing the insert into and through the filling end of the tube until the end portion of the insert extends into and, preferably, through and beyond the orifice formed by the neck, the adjacent portion abuts the inside of the shoulder, and the spine and flaps are folded into a generally "Z" shape and provide a partition which divides the tube into two compartments;

(iii) filling each of the compartments thereby concomitantly exerting additional pressure of the flaps against the tube inner wall; and (iv) sealing the filling end of the tube to form a straight line seal with said planar insert.

BRIEF DESCRIPTION OF THE DRAWINGS

While the specification concludes with claims particularly pointing out and distinctly claiming the subject matter regarding as forming the present invention, it is believed the invention will be better understood from the following description taken in connection with the accompanying drawings in which:

DETAILED DESCRIPTION

The present invention relates to a method of converting a standard commercially available tube into a novel co- or dual-dispensing tube by the insertion of an inexpensive divider before the filling of the two individual components. This insert once installed in the tube results in a novel co-dispensing means which will maintain the individual integrity of the two separate components until they are dispensed side by side in the proper proportion by the normal action of squeezing the tube.

Figure 1:
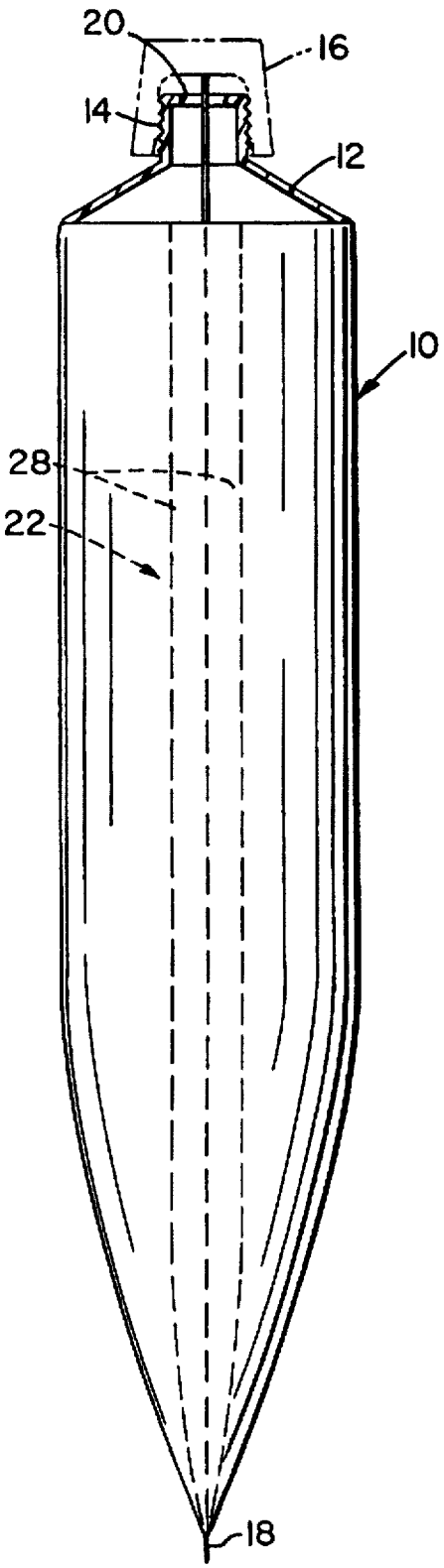
FIG. 1 is a verticial side elevation, partly in cross-section of the dual-chambered dispenser of the present invention showing the partition-forming insert member in a phantom view.
Figure 2:
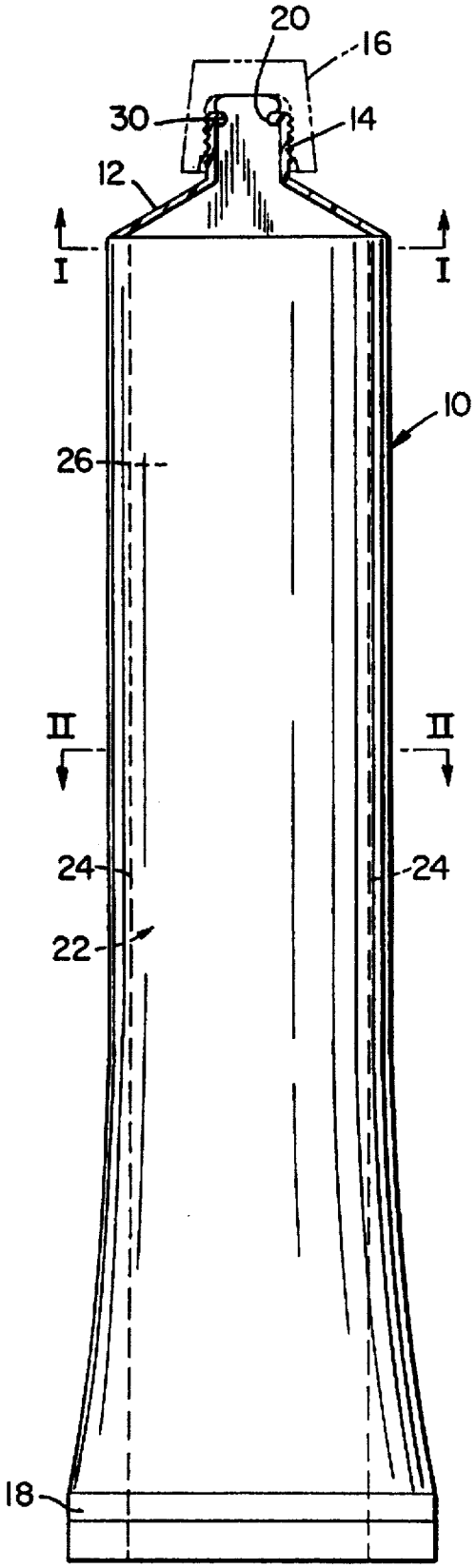
FIG. 2 is a vertical front elevation, partly in cross-section, of the dual-chambered dispenser of the present invention showing the partition-forming insert member in a phantom view and showing the insert protruding beyond the seal and before the trimming thereof.

The dual-chambered dispenser of the present invention is best viewed in FIGS. 1 and 2 of the drawings.

The dispensing tube illustrated in FIGS. 1 and 2 comprises a tubular body generally designated 10, to one end of which is integrally united a threaded headpiece or collar 12 and tube neck 14 adapted to receive a screw cap 16 shown in phantom view. The headpiece or collar may be of any desired configuration and may be united to the body 10 in any desirable manner. Preferably, the headpiece is of a thermoplastic material and is formed by molding and then fused to the body in any acceptable manner known in the art.

Tubes of this type customarily are formed and capped by the tube manufacturer and shipped to the packer with the bottom or filling end open. After being filled through the bottom end with a product, the tube is sealed with a transverse bottom end seal, such as at 18.

In a preferred embodiment, the inner periphery of the neck 14 is molded or otherwise fitted to provide a collet 20. As used herein the term "collet" is defined as a band, ferrule, flange or the like which is molded, stamped or otherwise provided around the inner diameter of the neck 14 at or near the terminus thereof. The dimensions of the collet's diameter must therefore, be smaller than the inside diameter of the neck and such collet essentially defines a dispensing orifice if it is located at or near the terminus of the neck.

The present invention contemplates the use of the three major types of squeezable tubes commercially available and which are suitable for dispensing product for consumer and professional use. They may be classified as plastic, preferably thermoplastic tubes fabricated from a mono-layer of sheet material, tubes fabricated from a sheet or foil of metal, preferably aluminum, or tubes fabricated from one or more sheets of the above materials which are laminated into a single sheet.

This tube body 10 may be of single or of laminated construction comprising several distinct layers bonded together. Generally, the body is formed from a flat web or blank which has been fabricated in a preliminary operation, an example of which is one wherein one or more thermoplastic films are extruded directly onto and bonded to opposite sides of an endless intermediate substrate. By way of illustration and not limitation, tube body 10 can be made up of an inner thermoplastic layer, an outer thermoplastic layer and an intermediate barrier layer of metallic foil, e.g., aluminum, all coextensively bonded together. Additional layers may be used, including intermediate layers of paper and/or special bonding thermoplastic adhesives formulated to provide good adherence of the thermoplastic layers to the foil layer.

The present invention is predicated on the use of a novel insert 22 which is usually inserted into the tube 10 on the product filling line thereby dividing the tube into two distinct chambers before filling.

Figure 3:
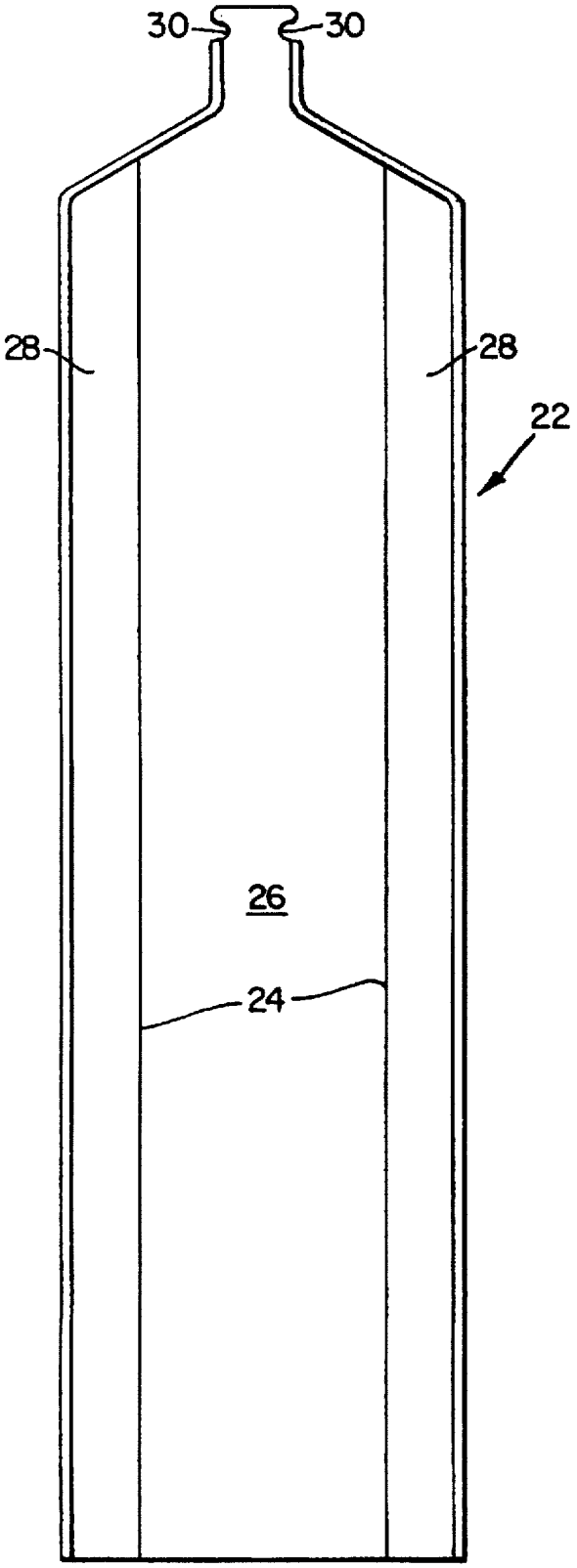
FIG. 3 is a vertical front elevation of the partition forming insert member showing a locking notch embodiment and a multi-layered gasket embodiment.

Reference to FIG. 3 of the drawings illustrates the basic configuration of insert 22. The drawings also illustrate the basic configuration in FIG. 4 of the installed insert 22 as it would appear from the bottom of an unsealed tube 10 and the insert 22 as it would appear in a sealed 10 tube in FIGS. 1 and 2.

The insert 22 can be made from a polymer coated board, e.g., paper or cardboard, from plastic sheet material, e.g., thermoplastic polymeric materials such as polyethylene, from laminated boards, or from laminates of boards and polymeric sheet materials or from any other inexpensive material that can be formed and can be heat sealed or mechanically crimped to provide sealed closure 18 to commercially available tubes.

The insert material must be thick enough to withstand insertion without folding, buckling or crimping, yet be flexible enough to change form when the lower portion of the tube is flattened and sealed. The inserts can be formed, to fit any commercially available tube size.

While the inserts can be formed by means of plurality of methods including the relatively costly method of molding, the inserts are preferably die cut. Thus, while the present invention provides for any method known in the art to form the inserts, the description herein shall refer to die cutting as the means of fabricating inserts. Since die cutting merely involves the cost of a die and not the cost of molds, inserts can be made available to fit all the major tube sizes without a large investment.

Referring again to FIG. 3 an insert 22 which, as preferred, is die cut with the width of the bottom thereof corresponding as nearly as possible to the internal width of the seal 18 with the tube 10. Scores 24 are provided, e.g., embossed, longitudinally along both sides and near the edges of insert 22 such that the distance between the scores 24 would be less than the diameter of the tube 10. This area or space between the scores is referred to herein as the spine 26 and the two areas extending outwardly from the scores 24 and to the outer edge of the insert 22 are referred to as the sealing flaps 28. The scores 24 are formed so the sealing flaps 28 can be folded in opposite directions. For example the right side flap would fold upwards and if folded completely would fold onto the front of the spine and the left side flap would fold downwards and if folded completely would fold onto the back of the spine. When inserted into the tube 10 the flaps 28 and the spine 26 generally conforms to a "Z" shape. This is illustrated in the bottom view of FIG. 4.

The flaps 28 may vary in width from the top to the bottom of the insert 22, including that area below the shoulder area, but must maintain a consistant or constant width for the spine 26. Increasing the overall width of the insert 22 results in wider flaps which are desirable to maintain or improve flap-to-wall interaction in the sealed tube and as closely as possible to the flattened sealed end. The total width of the flaps 28 plus the spine 26 cannot exceed one half the internal circumference of the tube 10 at the flattened sealed end 18. Other than at said flattened scaled end 18, the total of the flaps 28 and the spine 26 (with the spine having a constant width) can range up to about 50.0% greater than the dimension at the bottom.

The width of the spine 26 may range from about 50.0% to 99.0% of the diameter of the tube 10 when measured substantially above its flattened end, and is, preferably about 80.0% to 95.0% of the diameter. These dimensions provide adequate clearance for insertion of insert 22 into tube 10 and also optimum folding angles of the flaps so as to provide the greatest pressure exerted against the wall of the tube 10.

The scoring of whatever material the insert 22 is produced from is critical because the bend formed by the spine 26 and flap 28 must retain a memory of its flat or planer starting configuration yet allow the flap to readily and evenly fold along the line provided by the score 24. Thus, when the flap is bent it should tend to return to the flat or planer original configuration so that when the flap is restricted from returning to its original completely flat condition it applies a force against the restricting object. When placed in the tube 10 the restricting object will be the surface of tube wall. Because of the combination of the flexibility, shape and material of the flap 28 and the force applied by the bent flap, a seal is formed between the flap 28 and the tube wall 10. The seal can be improved if the ends of the flap 28 are die cut on an angle to form an edge in the sealing direction of each flap. The angle of the edge formed should match as nearly as possible the inner surface of the periphery of the tube at the point of contact with the angled edge flap 28 of the insert The flexibility of the flap 28 and the force provided by the score 24 is very critical to maintain a seal between the insert and the tube wall during product addition and during and after tube sealing. When a tube is sealed the bottom of the tube is flattened. The insert 22 is always installed into the tube so it will be parallel with the flattened portion at the tube seal 18.

The insert 22 is also designed so that in its full flattened position it is substantially the exact inside dimension of the tube if taken as completely flattened except for the shoulder 12 and neck 14. In this way the positioned insert 22 transforms from a configuration of folded flaps which are force-fitted against a round tube's inner wall to a flattened form at the tube seal 18. A typical commerical tube, when sealed, goes from a round cylinder slowly flattening to being fully flattened at the seal, as seen in FIGS. 1 and 2. A flap of the insert go from its maximum bend against a round tube's inner surface to slowly unbending as the tube flattens and the tube walls are further away from each other when taken along the axis of the seal 18. As mentioned above, the width of a flap 28 may vary and should preferably be sufficiently wide to optimize flap-to-tube wall interaction. The force resulting from the score 24 will maintain pressure and thereby a seal against the tube wall until the insert is fully flat at the tube seal. The flexibility of the insert and flap material therefore is critical, for in order to maintain a seal while the tube wall flattens out the flap itself must twist as it opens up to its full flat width. The flap must also fold in a configuration so that when the tube is filled the product exerts pressure against the flap with the result that increased pressure is exerted so as to optimize the seal of the flap with the wall of the tube.

The overall width of the insert 22 especially at the bottom seal area, is critical for it must be the same or very nearly the size of the flattened inside of the tube at the sealing area. It is characterized therefore as being about one half the inside circumference of the tube. The insert must seal or crimp between the two inner sides of the flattened tube, and must be made from or coated with material to produce an effective sandwich seal. The seal is therefore made up of three layers which are tube, insert and tube. Laminated and plastic tubes are heat sealed so the insert must be made of material or coated with material that is compatible and will seal with the tube.

The flaps 28 seal the insert 22 against the tube walls. The top portion of the insert is die cut to exactly duplicate the shape of the inside of the tube collar 12, and neck 14, see FIG. 2. The insert 22 also protrudes beyond the neck 14 and out through the tubes dispensing orifice (FIGS. 1 and 2). This extension beyond the dispensing orifice of the tube can be shaped to form a linear seal inside the tube cap 16. This maintains separation of the two products even into the cap and provides a seal which prevents cross contamination of the products within the filled tube.

The top of the insert 22 that extends beyond the dispensing orifice of the tube, can have a notch 30 cut on both sides which catch on or otherwise engage the flange of the collet 20 positioned in the tube orifice to act as a positive lock to hold the insert 22 in place during the product filling and sealing of the tube (FIG. 2). This lock is designed and positioned so it forces the insert to remain sealed against the inside of the tube collar 14.

Figure 4:
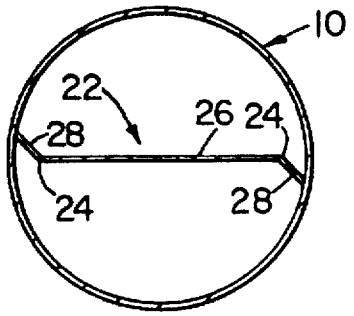
FIG. 4 is a cross-sectional view of the tube taken along line II—II of FIG. 2.
Figure 5:
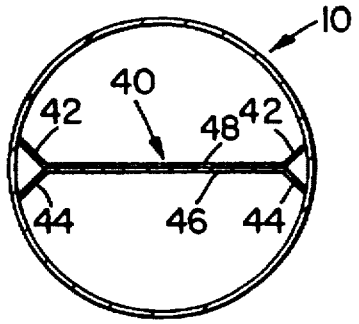
FIG. 5 is a cross-sectioned view showing a layered insert member embodiment and the four sealing flaps thus formed.

FIG. 5 illustrates an embodiment of an insert member 40 similar to the basic insert design described above, except that it provides better sealing of the insert 40 within the tube 10. In this embodiment the flaps do not form a "Z" fold (one flap up and one flap down) as in the basic insert unit shown in FIG. 4 for example, but instead four flaps 42—42 and 44–44 fold up and down respectively when two inserts 46 and 48 are attached back to back. Each of the inserts 46 and 48 are made of thinner material than the basic designed insert 22 so each of the four flaps would be more flexible for better sealing, while the spine, which is comprised of two laminated inserts (46 and 48) thick, has the structural integrity to be forced into the tube without bending or crimping. The two insert components 46 and 48 can be heat sealed or glued together at the spine to form the laminated insert 40.

The portion of the flaps corresponding to the tube collar or shoulder are tapered so as to fit the contour of the inside of said tube collar 12, and inasmuch as the flaps are thinner they do not have to be folded back out of the way before insertion into the tube. The tapered portion of the insert 40 fits into the open tube which begins splitting the adjacent flaps 42–44 apart as the insert is pushed further into the tube.

In this embodiment, as with the single layer insert illustrated in FIG. 4, the flaps do not have to be permanently prefolded with the possible lose of some of their memory and the force required to seal against the tube wall. Advantageously, this allows for easier stacking (not unlike a deck of cards) and facilitation of the handling of the inserts in automated inserting equipment.

In accordance with the invention, a plurality of embodiments are also contemplated which provide chemical and/or mechanical seal-means in addition to the basic pressure seal and thereby improve the sealing of the embodiments of FIGS. 4 and 5. For example, heat or sonic means may seal the insert or any part thereof to tube from the outside of the tube, without effecting the integrity or appearance of the tube or the contents therein. In addition, noncontaminating materials can be put onto the edges of the finished insert which will improve the seal between the insert and the inner surface of the tube when inserted into said tube. This chemical and/or mechanical seal enhancement can be accomplished in several different ways:

i) Use of an adhesive and/or caulking type material which is applied to the edges of the insert.

ii) A polymeric type material which is applied to the cut edges of the insert and which swells and becomes tacky when contacted by water or moisture contained in the product thereby forming the desired seal. The polymer is chosen based on its speed of swelling, tackiness and insolubility, so that it sets rapidly, remains in place and does not contaminate the product.

iii) Another embodiment which serves to improve the sealing of the partition forming inserts of FIGS. 4 and 5, utilizes a suitable polymeric material to help seal the edges as described above except the polymer is applied to the board before it is coated or laminated with a polymeric material as hereinbefore described. The sealing polymer is only exposed at the edges of the insert member once the board is coated or laminated and then die cut. Only where the cut edge, i.e., the sealing edge, of the board is exposed to product moisture does the polymer swell. Consequently, this system only forms a seal at the edge of the insert if moisture from the product contacts it. If the product does not migrate and reach an exposed edge due to effective pressure sealing, then the area is not in need of additional sealing. As the filled tube is used by consumers, if a slight shift of the insert or a change in the tube's shape weakens a seal, the insert provides in situ polymer where neeeded to continuously reform seals.

iv) The present invention provides still another embodiment which can be utilized with either of the configurations of FIGS. 4 and 5. This embodiment die cuts the insert before the polycoating or lamination step and then laminates both sides of the insert with a precut polymeric film or sheet or other tube sealing compatible film. The film to be laminated over the already die cut board would be patterned to the exact as possible to the outline of the flat insert except that it overlaps by a short distance, such as about one eighth inch, around the entire periphery of the flat insert. The insert would be laminated front and back with this cut and thus patterned sheet material. Where the front and back polymeric sheets overlap the board they are sealed to each other. Where the two sheets seal to each other they form a flexible gasket entirely around the edge or periphery of the insert. When inserted into the tube, such gasket provides improved sealing with essentially every surface the insert contacts once installed into the tube.

Figure 6:
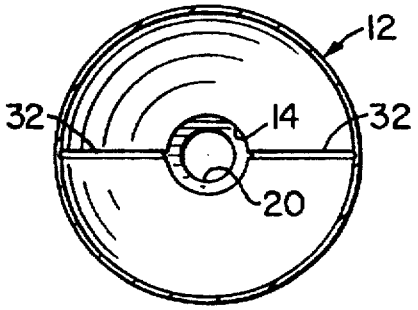
FIG. 6 is a cross-sectional view of the shoulder and neck taken along line I—I of FIG. 2.

FIG. 6 also illustrates an embodiment which improves sealing and also facilitates positioning of the insert 22 within the tube 10. Such embodiment comprises molding or otherwise performing a linear slot 32 into the inner surface of the shoulder 12 and that portion of the neck 14 below the collet 20. Such slot 32 which extends fully across the shoulder 12 provides a linear space into which the insert 22 fits and thereby provides a positioning guide and insert support. The slot at the widest part of shoulder 12, i.e. the point of insertion, is slightly larger than the inner diameter of the shoulder as well as that of the neck 14 at the corresponding point. The dimensions of the insert 22 would accordingly be increased at the shoulder portion and the neck to correspond to depth of the slot(s) 32 in the shoulder and neck. For illustrative purposes only the dimensions of the shoulder generally are such that the thickness of the molded shoulder is about 0.035 to 0.040 inch (35–40 mil) with the slots being from about 0.010 to 0.015 inch (10–15 mil) deep. The width of the slot should be from about 0.001 to 0.005 (1 to 5 mil) greater than the thickness of the insert 22. The insert 22 will, accordingly, be increased correspondingly in planar dimensions so as to fill the space provided by the slots 32. Generally about 0.001 to 0.005 inch (1–5 mil) clearance is provided for ease of insertion and in order to prevent buckling.

There are alternate methods of manufacturing the present embodiment, such as die cutting the inserts and laminating them between top and bottom continuous sheets of polymeric material. This is followed by a second die cut of the now laminated insert, but slightly larger than the outline of the insert itself, so the polymeric material extends beyond the outline of the insert to form a gasket.

In accordance with the present invention, a method for assembling the dual-compartment dispensing tube assembly comprises placing the tube on a filling line in an indexed position suitable for filling and sealing and directing the insert into and through the filling end of the tube until the end portion of the insert extends through and, beyond the orifice formed by the neck and the shoulder portion of the insert abuts the inside of the shoulder of the tube. The insert is directed in such a manner so that the spine and flaps are folded into either a generally "Z" shape of FIG. 4 or the four flap, laminated spine, of FIG. 5 and provide a partition which divides the tube into two compartments. Each of the compartments are filled and the filling end of the tube is sealed by heat, crimping or the like to form a straight line seal with planar insert. Preferably, tube neck is cylindrical and has a collet on the inner periphery thereof which engages diametrically opposed notches provided in the neck portion of the insert when it is directed into the tube. If desired the terminal dispensing end of the planar insert is of a configuration which compliments that of the inner surface of the closing cap such that directed into the tube the insert extends through and beyond the orifice formed by the neck for a distance sufficient to form a lineal seal within the cap.

While particular embodiments of the present invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed is:

1. A substantially planar partition-forming member suitable for insertion into a dispensing tube to form a partition and two separate and discrete compartments within the tube; said tube having a dispensing end with affixed thereto a shoulder and a neck terminating as a dispensing orifice and adapted to receive a closing cap and an open filling end into which the partition-forming member is inserted prior to filling;

said partition-forming member having a configuration such that when inserted into the tube[;]:

(i) the end of the partition-forming member corresponding to the dispensing end of the tube is substantially equal to the inner diameter of the neck and extends into said neck, (ii) the adjacent portion thereto conforms to the shape of the tube shoulder, (iii) the mid-portion extends within the tube and has a width corresponding to at least one half the inner-circumference of the tube; and (iv) the terminal end of the partition-forming member corresponding to the filling end of the tube has a width substantially equal to one half the inner-circumference of said tube.

said partition-forming member [being scored] *having foldable portions* along each longitudinal side at a distance from the edge thereof such that when fully inserted into the tube the partition-forming member folds along the [scoring] *foldable portions,* thereby providing a spine between the [scoring] *foldable portions* and *further providing* two flaps adjacent [thereto] *to the foldable portions*; and said partition-forming member being comprised of a material sufficiently resilient that such member tends to revert to its original planar configuration thereby causing pressure of the flaps against the inner surface of the tube and providing a seal along the longitudinal edge with said inner surface of the tube.

2. The partition-forming member of claim 1 wherein the dispensing end of said member is provided with diametrically opposed notches which engage a collet positioned on the inner periphery of the neck when inserted therethrough.

3. The partition-forming member of claim 1 wherein said member is die cut.

4. The partition-forming member of claim 1 wherein said member is comprised of a material which is bondable with a surface of the tube.

5. The partition-forming member of claim 1 wherein said member is formed from plastic sheet material, board material coated with a polymeric material, or a combination thereof.

6. The partition-forming member of claim 5, wherein said member comprises an inner layer of a board material and two outer layers of polymeric sheet material, the total planar dimensions of said polymeric sheets being greater than those of the paper board thereby resulting in a polymeric sheet to polymeric sheet overlapping in a plane with and around the edge of said member and said overlappping of sheets being laminated together to form a flexible sealing gasket in a plane with and around the edge of said member.

7. The partition-forming member of claim [1] *39* which is comprised of two similar [inserts] *insert* members positioned and adhered together so as to form one integral planar spine having four longitudinal scores and four oppositally projecting folds.

8. The partition-forming member of claim 1 wherein the edges of the flaps are cut at an angle to form a biased surface in the sealing direction of each flap.

9. The partition-forming member of claim 1 wherein the edges of said member which contact the inner surface of the tube are provided with noncontaminating sealing material.

10. The partition-forming member of claim 1 wherein the terminal dispensing end of said member is of a configuration which compliments that of the inner surface of the closing cap and when said member extends through and beyond the orifice formed by the neck for a sufficient distance it forms a lineal seal within the cap.

11. A dual compartment dispensing tube assembly, comprising:

a tubular container body having a dispensing end and affixed thereto a shoulder and a neck terminating as a dispensing orifice and adapted to receive a closing cap, and a filling end which is sealed after contents are placed in said compartments;

said tubular container body [have] *having* positioned therein a substantially planar partition-forming insert which provides two adjacent compartments defined by a common wall segment and a pair of outer arcuate walls;

said planar insert having a configuration generally conforming to that of the tube if flattened and comprising an end portion which is substantially equal to the inner diameter of the neck and which extends [through the orifice formed by] *into the* the neck, an adjacent portion conforming to the inside shape of the tube shoulder, a mid-portion extending axially within the tube and having a width of at least about one half the inner circumference of the tube, and a terminal end positioned within the filling end of the tube and having a width substantially equal to one half the inner-circumference of said tube;

said planar insert having [scoring] *foldable portions* along each longitudinal side to provide a spine between the [scoring] *foldable portions* and *to provide* a flap at either side of the [scoring] *foldable portions*, wherein said insert can be folded into a generally "Z" shape, and said planar insert being comprised of a material sufficiently resilient such that the insert tends to revert to its original planar configuration thereby causing pressure of the flaps against the inner arcuate walls thereby providing a pressure seal along the longitudinal edges with the surface of said arcuate walls.

12. The assembly of claim 10 wherein the planar insert is comprised of a material which is bondable with a surface of tubular container body.

13. The assembly of claim 11 wherein the dispensing end of the planar insert is provided with diametrically opposed notches which engage a collet positioned on the inner periphery of the neck when inserted therethrough.

14. The assembly of claim 11 wherein said planar insert is die cut.

15. The assembly of claim 11 wherein said planar insert is formed from plastic sheet material, board material coated with a polymeric material, or a combination thereof.

16. The assembly of claim 15, wherein said planar insert comprises an inner layer of board material and two outer layers of polymeric sheet material, the total planar dismensions of said polymeric sheets being greater than these of the board, thereby resulting in a sheet to sheet overlapping in a plane with and around the edge of said insert and said overlapping of sheets being laminated together to form a flexible sealing gasket in a plane with and around the edge of said insert.

17. The assembly of claim [11] *40* wherein the insert is comprised of two similar planar members positioned and adhered together so as to form one integral insert having four longitudinal scores which define a spine and four oppositally projecting flaps.

18. The assembly of claim 11 wherein the edges of the flaps are cut at an angle to form a biased surface in the sealing direction of each flap.

19. The assembly of claim 11 wherein the edges of the planar insert which contact the inner surface of the tube are provided with noncontaminating sealing material.

20. The assembly of claim 11 wherein the terminal dispensing end of said planar insert is of a configuration which compliments that of the inner surface of the closing cap and wherein said insert extends through and beyond the orifice formed by the neck for a distance sufficient to form a lineal seal within the cap.

21. The assembly of claim 11 wherein the shoulder and neck are provided with slots into which the planar insert fits, said planar insert having dimensions which substantially fill the voids provided by said slots.

22. The assembly of claim 11 wherein the tubular body is an extended tubular cylinder comprised of thermoplastic material, aluminum, or a laminated combination of at least two materials from any one or more of the above materials.

23. The assembly of claim 11 wherein, after filling, the filling end is sealed to form a straight line seal at said filling end with said planar partition-forming insert.

24. The assembly of claim 11 wherein the tubular container body has a cross-section which is a circle or an ellipsoid.

25. A method for assembling a dual compartment dispensing tube assembly, said assembly comprising:

a tubular container body having a dispensing end and a filling end, and a shoulder and a neck terminating as a dispensing orifice and adapted to receive a closing cap affixed to the dispensing end of the tube;

a substantially planar partition forming insert member having a configuration generally conforming to that of the tube if flattened and comprising:

an end portion which is substantially equal to the inner diameter of the neck;

an adjacent portion thereto conforming to the inside shape of the tube shoulder;

an elongated mid-portion having a width of at least one half the inner circumference of the tube; and a terminal end having a width sub-stantially equal to one half the inner-circumference of the tube;

[scoring] *foldable portions* along each longitudinal side of the insert to provide a spine between the [scoring] *foldable portions* and *to provide* an elongated flap at either side of the [scoring] *foldable portions*, said insert *being* comprised of a material sufficiently resilient such that the insert tends to maintain its planar configuration;

said method comprising:

(i) placing the tube in a position suitable for filling;

(ii) directing the planar insert into and through the filling end of the tube until the end portion of the insert extends into the orifice formed by the neck, the adjacent portion abuts the inside of the shoulder, and the spine and flaps are folded into a generally "Z" shape and provide a partition which divides the tube into two compartments;

(iii) filling each of the compartments; and (iv) sealing the filling end of the tube to form a straight line seal with the planar insert.

26. The method of claim 25 wherein the tube neck is cylindrical and has a collet positioned on the inner periphery thereof which engages diametrically opposed notches provided in the neck portion of the planar insert.

27. The method of claim 25 wherein the portion of the planar insert corresponding to the neck and shoulder is guided into and positioned in slots provided in the inner surface of the neck and shoulder.

28. The method of claim 25 wherein the planar insert is comprised of a material which is bondable with a surface of tubular container body.

29. The method of claim 25 wherein said planar insert is die cut.

30. The method of claim 25 wherein said planar insert is comprised of a material which is bondable with a surface of the tube.

31. The method of claim 25 wherein said planar insert is formed from polymeric sheet material, board material coated with a polymeric material, or a combination thereof.

32. The method of claim 31, wherein said planar insert Comprises an inner layer of board material and two outer layers of polymeric sheet material, the total planar dismensions of said polymeric sheets being greater than those of the board material, thereby resulting in a sheet to sheet overlapping in a plane with and around the edge of said insert and said polymeric sheet overlappping being laminated together to form a flexible sealing gasket in a plane with and around the edge of said insert.

33. The method of claim [25] *41* wherein the insert is comprised of two similar planar members positioned and adhered together so as to form one integral insert having four longitudinal scores which define a spine and four oppositally projecting flaps.

34. The method of claim 25 wherein the edges of the flaps are die cut at an angle to form a biased surface in the sealing direction of each flap.

35. The method of claim 25 wherein the edges of the planar insert which contact the inner surface of the tube are provided with noncontaminating sealing material.

36. The method of claim 25 wherein the terminal dispensing end of said planar insert is of a configuration which compliments that of the inner surface of the closing cap and wherein said insert extends through and beyond the orifice formed by the neck for a distance sufficient to form a lineal seal within the cap.

37. The method of claim 25 wherein the tubular body is an extruded tubular cylinder comprised of thermoplastic material, aluminum, or a laminated combination of at least two materials from any one or more of the above materials.

38. The method of claim 25 wherein the tubular container body has a cross-section which is a circle or an ellipsoid.

*39. The partition-forming member of claim 1 wherein said foldable portions comprise scoring disposed along each longitudinal side of said partition-forming member at a distance from the edge thereof such that when fully inserted into the tube the partition-forming member folds along the scoring, said two flaps being adjacent to said scoring and said spine being disposed between said scoring.*

*40. The assembly of claim 11 wherein said foldable portions of said planar insert comprise scoring disposed along each longitudinal side of said insert, each said flap being disposed on either side of said scoring, and said spine being disposed between said scoring.*

*41. The assembly of claim 11 wherein said end portion of the planar insert extends through the orifice formed by the neck.*

*42. The method of claim 25 wherein said foldable portions of said planar insert comprise scoring disposed along each longitudinal side of said insert, each said elongated flap being disposed on either side of said scoring, and said spine being disposed between said scoring.*

* * * * *